United States Patent [19]

Fossas et al.

[11] Patent Number: 5,417,807
[45] Date of Patent: May 23, 1995

[54] DEINKING FORMULATION FOR FLEXOGRAPHIC INKS

[75] Inventors: Francisco F. Fossas; Pedro F. Ferre; Narciso R. Castano, all of Barcelona, Spain; Stephen P. Williams, Winston-Salem; Hideaki Urushibata, High Point, both of N.C.

[73] Assignees: KAO Corporation, Barcelona, Spain; High Point Chemical Corp., High Point, N.C.

[21] Appl. No.: 68,418

[22] Filed: May 27, 1993

[51] Int. Cl.⁶ .................................. D21C 5/02
[52] U.S. Cl. ............................... 162/5; 252/162
[58] Field of Search ................. 162/5, 8, 4, 6; 252/162

[56] References Cited

U.S. PATENT DOCUMENTS

| | | | |
|---|---|---|---|
| 4,053,427 | 10/1977 | Hotten | 252/406 |
| 4,360,439 | 11/1982 | Calmanti et al. | 252/61 |
| 4,483,742 | 11/1984 | Bridle | 162/5 |
| 4,872,953 | 10/1989 | Smith | 162/261 |
| 4,959,123 | 9/1990 | Lehmann et al. | 162/5 |
| 5,100,574 | 3/1992 | Urushibata et al. | 252/162 |
| 5,200,034 | 4/1993 | Richmann et al. | 162/5 |
| 5,217,573 | 6/1993 | Tsai et al. | 162/5 |
| 5,221,433 | 6/1993 | Daute et al. | 162/5 |
| 5,228,953 | 7/1993 | Bast et al. | 162/5 |
| 5,248,388 | 9/1993 | Richmann et al. | 162/5 |
| 5,288,369 | 2/1994 | Ishibashi et al. | 162/5 |

*Primary Examiner*—W. Gary Jones
*Assistant Examiner*—Mark De Simone
*Attorney, Agent, or Firm*—Bruce F. Jacobs

[57] ABSTRACT

The removal of hydrophilic flexographic inks from a pulp fiber slurry in a flotation or flotation/wash deinking system is accomplished by using a combination of (a) a fatty acid or salt thereof, (b) a rosin acid or salt thereof, and (c) a non-ionic or anionic surfactant along with water having a hardness of about 80 to 500 ppm $Ca^{+2}$.

17 Claims, No Drawings

DEINKING FORMULATION FOR FLEXOGRAPHIC INKS

BACKGROUND OF THE INVENTION

The present invention is directed to the removal of inks, particularly very fine particles of hydrophilic flexographic inks, from recycled paper products, i.e. deinking. Flexographic (hydrophilic) inks are becoming of greater and greater importance due to their greater environmental friendliness and lower equipment investment costs than when using conventional hydrophobic ink systems. However, limiting the growth in flexographic ink usage has been the difficulty in recycling paper with flexographic inks in flotation deinking systems.

"Deinking" is the process of removing ink and other contaminants from waste paper and there are two main techniques in current use. "Flotation deinking" entails forming an aqueous suspension of waste paper pulp fibers, inks, and other non-cellulosic contaminants and then mixing air into the suspension. In the presence of various additives, air bubbles selectively attach to ink particles and carry those particles to the surface of the aqueous suspension, thereby forming an ink rich froth. The froth is then removed leaving behind a relatively ink-free fiber slurry. Flotation deinking processes have heretofore been especially useful in removing hydrophobic inks with particle sizes larger than about 10 $\mu$m. The additives used in such processes are generally specialty surfactants or fatty acids which are intended to agglomerate the relatively large hydrophobic ink particles to increase removal efficiency in the flotation cells. The presence of additives which would disperse the ink particles rather than agglomerate them is considered detrimental to the effectiveness of the flotation stage.

"Wash deinking," on the other hand, is particularly useful when the ink and other particles being removed are smaller than about 5 $\mu$m. The process requires the addition of dispersants so that when a dilute waste paper pulp slurry is thickened, the very fine particles, including the hydrophilic flexographic type inks, will tend to stay with the water being removed to thereby produce a relatively clean pulp.

Newspapers, magazines and other printed media have been recycled for many years. Recently the need to recycle paper has increased significantly and will likely continue to increase in the future in view of environmental concern and legislative action. To reclaim fibers from printed material, a deinking process is required to remove the ink and other contaminants. Deinking of waste paper has become increasingly more difficult, however, because of changes in the printing techniques being used and the wide variety of printing inks. As a result, a slurry of recycled waste paper contain mixtures of hydrophilic and hydrophobic inks, resin binders, fillers, and the like, the substantial majority of which must be removed to produce a paper product having sufficient whiteness to be used in many commercial applications. The materials being removed, in addition to having a wide range of particle sizes, include polymeric binders such as polystyrene, polyacrylates, and acrylic copolymers. This has made removal of many of the newer inks more and more difficult. The industry response has generally been to utilize deinking systems which combine both flotation and washing processes.

However, the requirements for flotation and wash processes are different and are in conflict with each other. In flotation processes, relatively large ink particles are agglomerated to a size where they can be removed, while in washing processes relatively fine ink particles are dispersed so that they can be removed. This dichotomy has been further effected by recent changes in printing techniques which have resulted in an ever-increasing usage of hydrophilic flexographic inks. The very fine ink particles (<5 $\mu$m) associated with such flexographic inks can currently be substantially removed only by means of washing processes. The increasing usage of the very fine particle size hydrophilic flexographic inks is causing increasing problems in attaining the brightness necessary to permit the use of recycled paper products in many applications.

The difficulty in using flotation deinking for removal of hydrophilic flexographic inks is compounded because flotation deinking is generally operated under alkaline conditions, i.e. at a pH between about 8.5 and 10, while the hydrophilic flexographic inks become insoluble at pH's below about 7 so that neutral or acidic conditions are desired for their removal.

The conventional industry chemical formulations for flotation deinking for many years have entailed using a fatty acid or fatty acid soap. See, for example, U.S. Pat. Nos. 4,964,949 and 4,483,741. Fatty acids and fatty acid soaps have a number of problems associated with their use. They require high dosage rates, typically at least about 16 pounds/ton of waste paper (0.8 wt %) but often as high as 30 pounds/ton (1.5 wt %). Also, despite their use, fatty acids and fatty acid soaps are relatively poor foaming agents especially in the presence of hydrophilic flexographic inks which has led to current flotation deinking processes doing a poor performance of removing such inks.

In a Bulgarian laboratory study of flotation deinking in the early 1970's (prior to the advent of hydrophilic flexographic inks), waste paper containing hydrophobic inks dispersed in an asphalt binder was shredded, soaked in water for for 2–3 hr, fiberized and mixed with reagents to cause saponification of the asphalt binder and dissolution of the hydrophobic ink. Flotation deinking was performed with: liquid soap, technical grade oleic acid, stearic acid, tall oil fatty acids, and tall oil. Although few details or results are provided, the article states that the best results occurred when tall oil was used at an amount of 0.30%, with a flotation time of 15–20 minutes, and with the water exhibiting a hardness of less than about 3 mg eqv per liter (equivalent to 60 ppm $Ca^{+2}$). In fact, the article states: "the hardness of the water used in the process must not exceed 3 mg eqv/liter." Mikhailova et al, "Deinking of Waste Newspapers by the Flotation Process," Tseluloza Khartiya 4, No. 2, 22–24, 30 (March/April 1973).

Tall oil generally contains (a) about 55–60 wt % tall oil fatty acids which have been reported to contain about 45 wt % oleic acid, about 40 wt % linoleic acid and about 15 wt % resin acid and (b) about 40–45 wt % rosin acids. Rosin acids (also known as resin acids) are alkylated, tricyclic, unsaturated organic acids. The two main rosin acids of tall oil are abietic acid and pimaric acid. Rosin acids and fatty acids are both commonly referred to as being amphipathic because they have a small polar carboxyl group attached to a large bulky hydrophobic hydrocarbon portion. When such acids are adsorbed onto the surface of a material, the polar hydrophilic end is oriented toward the surface of the material with the hydrophobic portion directed toward the water. Rosin acids are particularly useful as paper sizes. Commercial rosin acid products, generally containing more than about 80 wt % rosin acids, are also particularly useful as additives to provide tack (stickiness) for rubber polymers, in ink resin formulations, and in adhesive resins, particularly when color stability is not critical.

Recently, specific non-ionic surfactants such as are described in U.S. Pat. Nos. 4,964,949 and 5,100,574 have been especially developed for use in flotation deinking systems.

However, as the levels of hydrophilic flexographic ink continue to increase in waste paper, the previous deinking compositions are being found less and less effective in the removal of such ink particles in a flotation deinking procedure, especially one which is operated for about 8 minutes or less. As such, there is a continuing need to develop improved flotation deinking additive compositions which will effectively and rapidly deal with the changing compositions of waste recycled paper.

Accordingly, it is an object of the present invention to produce a deinked printed media which media had previously contained very fine hydrophilic ink particles, e.g. the flexographic inks present in increasing quantities in waste paper, by means of a flotation deinking process.

It is a further object of the invention to remove hydrophilic flexographic inks from printed media in a flotation deinking process while minimizing scale deposition therein.

It is a further object of the invention to remove hydrophilic flexographic inks from printed media in a flotation deinking process while limiting the time required for completing the process.

These and still further objects will be apparent from the ensuing description of the present invention.

SUMMARY OF THE INVENTION

The present invention is directed to a deinking method for removing hydrophilic inks from recycled printed media, said inks being present either alone or more commonly in combination with hydrophobic inks, in a flotation deinking system either alone or in combination with a wash deinking system. The deinking is accomplished by adding to an aqueous waste paper pulp slurry (a) a fatty acid or salt thereof, (b) a rosin acid or salt thereof, and (c) a non-ionic or anionic surfactant. The fatty acid will represent at least about 60 wt % of the three components with the balance being the rosin acid and the surfactant in a weight ratio ranging from about 12:1 to about 1:5. Use of the deinking additive combination of the present invention has been found to effectively and efficiently remove hydrophilic inks in a flotation process or in the flotation stage of a combined flotation/-wash process, especially when using water having a hardness of from about 80 to 500 ppm Ca+2.

By using the three deinking additives at appropriate levels, release of hydrophilic flexographic inks from the waste paper fibers is accomplished without overdispersing the inks while simultaneously initiating agglomeration of the fine hydrophilic ink particles and then completing the agglomeration to a sufficient extent that the ink particles coalesce and are of sufficient size to be effectively and efficiently removed in the froth of conventional flotation deinking equipment. Compared to prior deinking processes with fatty acids or their salts alone the present combination yields significant increases in brightness and lower residual ink contents in processed pulps which contain substantial amounts of hydrophilic flexographic inks.

DETAILED DESCRIPTION OF THE INVENTION

The deinking procedure of the present invention entails the use of a flotation stage to remove very fine hydrophilic (flexographic) inks from printed media, particularly waste newspapers, in which up to 100% of the ink may be flexographic. The benefits of this invention are clearly evident when at least about 7.5 wt %, preferably at least about 20 wt %, more preferably at least about 30 wt %, and even up to 100 wt %, of the printed media being recycled was printed with a hydrophilic flexographic ink having a particle size of less than about 5 μm. The need for and benefits from the invention are more evident as the flexographic ink content of the printed media increases.

More particularly, the first component of the deinking formulation is a fatty acid or salt thereof of the formula $R^1COO$-M wherein $R^1$ is a linear, branched, or cyclic alkyl or alkenyl group having about 7 to about 48 carbon atoms and M is hydrogen or a counterion such as Na, K, Ca, $NH_4$, or $NH_x(CH_2CH_2OH)_y$ wherein x and y are each integers from 0 to 4 and total 4. Most commonly, for economic reasons the fatty acid or salt thereof is used in the form of a mixture of such materials having about 12 to 24 carbon atoms and derived from natural oils such as marine, rapeseed, tallow, tall oil, soy, cottonseed, coconut, and the like. Such fatty acids, salts, and mixtures are either commercially available or may be manufactured by known techniques. The fatty acid functions primarily to agglomerate ink particles. The fatty acid or salt is added either to an aqueous pulp slurry either during pulping or as the slurry is introduced into the flotation stage. Fatty acid is used herein to include a fatty acid which has been pre-reacted with, e.g., calcium to form a salt and is used as an aqueous salt emulsion or dispersion.

The second component is a rosin acid or salt thereof of the formula $R^2COO$-M wherein $R^2$ is an unsaturated, alkylated, tricyclic, fused ring containing about 20 carbon atoms and M is hydrogen or a counterion. Rosin acids are generally derived in mixtures from natural sources such as wood rosin, gum rosin, tall oil, and the like. While the rosin acids may be separated into individual acids for use herein, no benefit from so doing has been noted. The two main rosin acids are abietic acid and pimaric acid.

The third component is an anionic or non-ionic surfactant. Any anionic or non-ionic surfactant may be used herein provided that it is capable of dispersing the rosin acid in water. Preferably, the surfactant is a non-ionic surfactant. Most preferably, the non-ionic surfactant is a non-ionic alkoxylated surfactant which may be represented by the general formula:

wherein AO is an oxyalkylene group having 2 to about 4 carbon atoms or a mixture of such groups in random or block configuration; R is selected from the group consisting of (a) linear and branched alkyl and alkenyl groups having about 7 to about 24 carbon atoms; (b) $R^3CO$— wherein $R^3$ is a linear or branched alkyl or alkenyl group having about 7 to about 24 carbon atoms; (c) $(R^4)_aC_6H_{5-2}$— wherein $R^4$ is linear or branched $C_7$–$C_{18}$ alkyl and alkenyl and "a" is an integer from 1 to 3; (d) a group derived from a linear, branched, and cyclic aliphatic polyol having about 2 to 6 carbon atoms; and (e) a group derived from a linear, branched, and cyclic aliphatic diacid having about 8 to 42 carbon atoms; $R^0$ is selected from the group consisting of H, $R^3$ and $R^3CO$; n is a number from about 4 to about 250; and m is an integer from about 1 to 6.

Suitable polyols include, for example, ethylene glycol, propylene glycol, trimethylene glycol, butylene glycol, glycerol, trimethylol propane, trimethylol ethene, 1,2,4-butanetriol, 1,2,6-hexanetriol, 1,1,1-trimethylol hexane, pentaerythritol, diglycerol, and sorbitol. Suitable diacids include, for example, octanedioic (suberic), nonanedioic (azelaic), hexadecanedioic (thapsic), octadecanedioic, and heneicosanedioic (japanic) acids.

The non-ionic surfactant component may comprise mixtures of two or more ethoxylated and/or propoxylated materials. Presently preferred non-ionic surfactants include surfactants based on mono- and diglycerides or a naturally occurring fatty acid which have been ethoxylated and/or propoxylated. A particularly preferred non-ionic surfactant is the mixture derived from the reaction of a fat such as tallow tallow with potassium hydroxide, glycerol, ethylene oxide and propylene oxide such as is described in U.S. Pat. Nos. 4,964,949 and 5,100,574 which includes as major components each of the following structures:

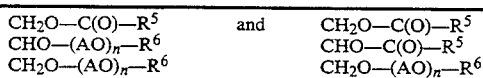

wherein $R^5$ is an alkyl group derived from the fat, e.g. tallow and $R^6$ is either H or $R^3CO$. The non-ionic surfactant generally functions as a penetrant of the paper fiber in the slurry and stabilizes the ink particles so that they do not redeposit on the pulp fibers. Generally, the non-ionic surfactant component is either commercially available or may be made by techniques well known in the art.

The total amount of deinking additives generally used in the present invention is about 0.25 to about 1.5, preferably about 0.4 to 1 wt %. The fatty acid or salt thereof will be about 60 to 90 wt %, the rosin acids about 3 to 30 wt %, and the surfactant about 2 to about 35 wt %, all based upon the total deinking additives used. The preferred weight ratio of the rosin acid:surfactant is about 12:1 to about 1:5, more preferably about 8:1 to about 1:1. Still more preferably, the fatty acids are about 65 to 85 wt %, the rosin acids about 10 to 25 wt %, and the surfactant about 3 to 20 wt % of the deinking additives.

The combination of the rosin acid and the surfactant facilitate and accelerate more effective agglomeration of the very fine hydrophilic flexographic ink particles into particles amenable to effective removal in a flotation process. The combination is used in a total amount sufficient to either increase brightness of a filter pad prepared from media wherein at least about 7.5% thereof was printed with a hydrophilic flexographic ink by at least about 2% or to increase the rate of ink removal as a function of time in the flotation cell, both as compared to a fatty acid alone.

The deinking technology of the present invention may be used with water hardness levels ranging from about 80 to about 500 ppm $Ca^{+2}$. Preferably the water hardness is from about 100 to about 400 ppm $Ca^{+2}$ since, particularly at the lower end of the range, the additives are generally sufficient to minimize the generation of undesirable deposits. When a fatty acid is used in the form of an aqueous salt emulsion or dispersion, the water need contain no hardness.

The deinking procedure of the present invention entails the use of a flotation stage to remove very fine, i.e. a particle size of <about 5 μm, hydrophilic flexographic inks from printed media. Generally, the process begins with the addition of the deinking additives into a standard pulping step in which printed waste paper, often in combination with virgin wood pulp, is treated in an alkaline medium with water in a reactor having an agitation system. The aqueous suspension so formed contains pulp fiber, inks, coatings, inorganic fillers, and the like, in an amount of from about 3 to 18 wt % and is maintained at a pH of about 7.5 to 11. Typical pulping chemicals used in the pulper include such as NaOH and hydrogen peroxide. Sodium silicate, a metal chelating agent such as diethylenetriaminepentaacetic acid (DTPA), and calcium chloride may also be added to the pulper. According to the process of this invention, the additives are generally added directly to the pulper during the pulping stage, although a portion of the deinking additives can be withheld and added prior to flotation.

As a result of the addition of the combination of additives of this invention, the hydrophilic ink particles are released from the recycled printed media and agglomerated into larger particles. After the slurry exits the pulper, it is diluted to about 1 wt % solids and transferred into flotation deinking equipment. Thereafter, air is introduced into the flotation equipment to cause vigorous mixing of the diluted pulp slurry. The air bubbles then attach to the agglomerated fine hydrophilic ink particles and carry the agglomerated particles to the surface of the flotation equipment and form a froth thereon. This ink-rich froth is removed from the surface in any of the conventional manners well known in the art of deinking. The froth is a mixture of bubble sizes with rigidity in the flotation equipment. Upon leaving the flotation cell and the continuous air bubble supply, the froth collapses so that the resulting inky liquid can be easily removed and sent to waste treatment prior to disposal. It is a particular advantage of the present three component deinking system that the flotation can be completed in less than about 10 minutes, commonly less than about 8 minutes, more commonly about 6 minutes or less, and when multiple (for example 3 or 4) flotation cells are used in series the time per cell can be 3 minutes or less.

Following the flotation deinking procedure, the pulp slurry is thickened to about 6 to 12 wt % solids and washed using conventional equipment readily available and in widespread commercial use. The filtrate from the washing is typically treated in a dissolved air flotation (DAF) clarifier to remove inks, fillers, fiber fines, and other suspended solids so that the filtrate water can be recycled for use in a subsequent deinking procedure. Commonly, cationic and/or anionic polymers are added to the filtrate prior to or in the dissolved air flotation clarifier so that the suspended solids will be agglomerated and/or flocculated and removed.

Many modifications and variations of the basic deinking procedure explained herein have been proposed and/or are in commercial use and the method of the present invention may be applied to those procedures.

The simple system explained herein is used for illustration purposes only and is not meant to be in limitation of the scope of this invention. The pulping process may be carried out either in a continuous way or batchwise, with excellent results with any type of printed media including newspaper, magazines, printed cardboard and colored printed media. The recycled paper is fed to the process so that it is present in an amount of about 10 to 100 wt % of the fiber undergoing pulping. The equipment used in this process is conventional equipment which is readily available and in widespread use.

The deinking composition of the present invention has several advantages when compared to the prior deinking of printed media printed which contains substantial amounts of water-soluble hydrophilic flexographic inks. Specifically, a significant increase in brightness with lower residual ink content in the pulp after flotation is realized when using this method. The foam volume and height are also increased by the addition of the rosin/surfactant combination.

It has also been found that the dosage rate of the fatty acid component of the composition can be substantially reduced from the about 1-2 wt % for a conventional process to about 0.35 to 0.7 wt % for the present invention. This lower amount significantly reduces the potential for scale and deposit problems normally associated with fatty acid components of deinking formulations.

The advantages of the deinking composition of the present invention as compared with conventional fatty acid deinking is illustrated in the following Examples in which all parts and percents are by weight unless otherwise specified. All filter pads for brightness were made using alum as specified in TAPPI Test Method T 218 om-83. Where necessary the pulp samples were first diluted to 1 wt % solids with tap water, 2 ml of 10% alum solution added to each sample, and the slurry then thickened on a Buchner funnel using Ahlstrom grade 631-25 filter paper. The filter pads were air dried before taking brightness measurements. All brightness data was obtained using an ACS Spectrosensor II spectrophotometer and reported as TAPPI 452 brightness. The brightness data represents the percent of light at wavelength 457 nanometers which is reflected off the filter pad and recorded by the spectrophotometer.

EXAMPLE 1

A mixture of 20% OMG (old magazines), 80% ONP (old newspapers) (25% flexo printed) are shredded dry and thoroughly mixed to form a master batch. 200 g of the mixture is added to a laboratory pulper along with 3,800 g water (40° C.) and conventional pulping additives (NaOH 1%, $Na_2SiO_3$ 2%, and $H_2O_2$ 0.7%) to make a final consistency of 5%. Using a syringe, the deinking additives as shown in Table I below are added at a total dosage rate of 0.7%, as calculated on a 100% active basis, based upon the dry weight of the paper added to the pulper. The fatty acid is a fatty acid soap (tallow fatty acid sodium salt) (DI-280 available from High Point Chemical Corporation). The rosin acid is a commercially available mixture of such acids (Westvaco R-24 rosin from Westvaco Chemicals) derived from tall oil and containing about 91.5% rosin acids and about 4% tall oil fatty acids. The surfactant is a nonionic surfactant predominantly containing a mixture of mono- and di-glycerides of tallow which has been alkoxylated (DI-600 available from High Point Chemical Corporation). The compositions are each pulped for 10 minutes. The contents are diluted to 1% solids by the addition of water and then a filter pad (identified as "Fb" for "before flotation") is made for measuring the brightness of the pulp prior to deinking.

5,000 g of the 1% stock slurry is then placed in a laboratory flotation cell, 200 ppm of water hardness as $Ca^{+2}$ is added, and the cell run for 6 minutes with an air flow of 4.5 liters per minute. The froth that collects on the surface is removed periodically and the foam height measured. After 6 minutes the air flow to the flotation cell is stopped and the operation ended. A second filter pad (identified as "Fa" for "after flotation deinking") is made for measuring the brightness of the deinked pulp.

The remaining 1% slurry is thickened to 10% on an 80 U.S. mesh sieve to simulate a washing process and a third filter pad (identified as "Wa" for "after washing") is made.

The deinking compositions which are evaluated, both comparative and within the scope of this invention and the results obtained therewith are provided in Table I.

TABLE I

Results of Example 1

| Composition, % | | | Brightness, % | | |
|---|---|---|---|---|---|
| FA | ROS | SURF | Fb | Fa | Wa |
| 100 | — | — | 43.7 | 48.5 | 49.8 |
| 86.5 | 13.5 | — | 44.1 | 48.8 | 50.2 |
| 73 | 27 | — | 43.9 | 49.1 | 50.5 |
| 59.5 | 40.5 | — | 44.2 | 49.2 | 50.7 |
| 82.2 | 12.8 | 5 | 44.1 | 51.3 | 53.2 |
| 69.3 | 25.7 | 5 | 43.9 | 51.5 | 54.4 |
| 56.5 | 38.5 | 5 | 44.1 | 50.6 | 51.2 |

FA = total fatty acid content
ROS = total rosin acid content
SURF = surfactant content The results in Table I indicate that, with a 20% hydrophilic flexographic ink printed media, there is little difference in flotation deinking performance between the use of 100% fatty acid and when a portion of the fatty acid is replaced by rosin acids. However, when a portion of the fatty acid is replaced by a combination of rosin acids and surfactant, the brightness of the resulting filter pads are substantially increased. It is also evident that with all three additives, when the rosin acid content is too high, i.e. increased to 40.5%, the deinking performance is not as good as when it is at a lower level.

EXAMPLE 2

The basic procedure of Example 1 is repeated but varying the amount of printed media which contains a hydrophilic flexographic ink while comparing the performance of composition of this invention: 82% tallow based fatty acid soap, 10% rosin acids, and 8% nonionic surfactant (DI-600) to that of a 100% tallow based fatty acid soap. The waste paper is 100% ONP. The water hardness is 350 ppm $Ca^{+2}$. The results of the tests are shown in Table II in which differences in the filter pad brightnesses (Fa-Fb) between the composition of this invention vs. that of the fatty acid alone are seen to increase with increasing levels of flexographic hydrophilic inks. Also as the flexographic ink content increases, there is a large increase in the absolute brightness values obtained with the present invention as compared to fatty acid only.

TABLE II

| | Results of Example 2 | | | | |
|---|---|---|---|---|---|
| | Fatty Acid Only | | Invention | | |
| % Flexo Ink | Fb | Fa | Fb | Fa | % Difference |
| 0 | 44.1 | 49.9 | 44.7 | 50.4 | −0.1 |
| 20 | 40.4 | 47.5 | 41.5 | 49.9 | +1.3 |
| 40 | 37.2 | 44.3 | 40.2 | 48.6 | +1.3 |
| 60 | 37.4 | 43.4 | 39.3 | 48.0 | +1.7 |
| 80 | 31.4 | 34.9 | 38.9 | 47.0 | +4.6 |
| 100 | 28.2 | 30.1 | 38.2 | 46.5 | +6.4 |

EXAMPLE 3

Using the same basic procedure as in Example 2 with pulping followed by flotation a comparison is made between the following deinking systems: a fatty acid only vs. a composition containing 81.5% fatty acid, 12.5% rosin acids, and 6% non-ionic surfactant (DI-600). The flotation deinking process is performed at a water hardness of 150 ppm $Ca^{+2}$ using varying levels of flexographic hydrophilic ink containing printed media. The results shown in Table III demonstrate the increasing benefit of the deinking additive combination of this invention as the content of hydrophilic ink in the waste paper increases.

TABLE III

| | Results of Example 3 | | |
|---|---|---|---|
| % Flexo Ink | Fatty Acid Only Fa | Invention Fa | % Improvement |
| 0 | 47.5 | 48.7 | 1.2 |
| 10 | 43.7 | 49.0 | 5.3 |
| 20 | 43.8 | 50.2 | 6.4 |
| 30 | 41.7 | 52.2 | 8.5 |
| 40 | 38.4 | 54.1 | 15.7 |
| 50 | 38.6 | 52.5 | 13.9 |

EXAMPLE 4

To compare the performance of a flotation deinking composition of the present invention with a commercial composition which is reported as giving reasonable results in the deinking of media containing flexographic ink. The basic procedure of Example 1 is repeated with a mixture of 33.3% magazines, 33.3% old newspapers, and 33.3% flexographic ink printed media. The waste paper is shredded dry and added to a pilot plant pulper along with water and NaOH 1.5%, $Na_2SiO_3$ 2%, diethylenetriamine pentaacetic acid (DTPA) 0.3%, and $H_2O_2$ 1.0%). The deinking additives of this invention are: 70.1% tallow based fatty acid soap, 25.9% rosin acids, and 6% non-ionic surfactant (DI-600). The comparative flotation deinking additive is Lionsorb 951 of Lion Chemicals Inc. which is intended for use in flotation deinking with flexographic ink-containing media. The results are shown in Table IV.

TABLE IV

| | Results of Example 4 | | |
|---|---|---|---|
| Additive | Dosage, % | Fb | Fa |
| Lionsorb 951 | 1.5 | 38.1 | 54.1 |
| " | 0.7 | 41.5 | 52.3 |
| DI-600 only | 0.5 | 43.1 | 51.8 |
| Invention | 0.7 | 41.6 | 59.1 |

What is claimed is:

1. In the flotation deinking of printed media in which at least about 7.5 wt % of the media was printed with a hydrophilic flexographic ink having a particle size of less than about 5 μm by performing the steps of: (1) forming a pulp slurry comprising printed media and water having a hardness of at least about 100 ppm $Ca^{+2}$; (2) adding to the slurry a fatty acid or salt thereof of the formula $R^1COOM$ wherein $R^1$ is a linear or branched alkyl or alkenyl group having about 7 to about 24 carbon atoms and M is hydrogen or a counterion; and (3) subjecting the slurry to flotation deinking in a flotation cell, the improvement comprising further adding to the slurry prior to the flotation deinking (a) a rosin acid of the formula $R^2COO-M$ wherein $R^2$ is an unsaturated, alkylated, tricyclic, fused ring containing about 20 carbon atoms and M is hydrogen or a counterion and (b) a non-ionic or anionic surfactant which is capable of dispersing the rosin acid in water, said rosin acid and surfactant being added in a weight ratio of rosin acid to surfactant of about 12:1 to about 1:5 and in a total amount sufficient to increase the brightness of a filter pad prepared from the hydrophilic flexographic ink-containing media by at least about 2%, wherein the rosin acid and the surfactant agglomerate fleographic ink particles prior to the flotation deinking.

2. The method of claim 1, wherein the rosin acid comprises a mixture of abietic and pimaric acids.

3. The method of claim 1, wherein the surfactant is a non-ionic surfactant.

4. The method of claim 3, wherein the non-ionic surfactant is derived from mono-and diglycerides of a naturally occurring fatty acid which glycerides have been alkoxylated.

5. The method of claim 1, wherein the fatty acid, rosin acid and surfactant are used in a total amount of about 0.3 to about 1.5 wt % based upon the weight of the printed media.

6. The method of claim 5, wherein the fatty acid will be about 60 to 90 wt %, the rosin acid about 5 to 30 wt %, and the surfactant about 2 to about 25 wt %, each of the total amount.

7. The method of claim 5, wherein the fatty acid will be about 65 to 85 wt %, the rosin acids about 10 to 25 wt %, and the surfactant about 3 to 20 wt %, each of the total amount.

8. The method of claim 1, wherein the rosin acid is derived from natural source selected from the group consisting of wood rosin, gum rosin, and tall oil.

9. The method of claim 1, wherein the fatty acid or salt thereof is a mixture derived from a natural oil selected from the group consisting of marine, rapeseed, tallow, tall oil, soy, cottonseed, and coconut oils.

10. The method of claim 1, wherein the flotation deinking is performed at a water hardness of about 100 to about 400 ppm $Ca^{+2}$.

11. In the deinking of printed media in which at least about 7.5 wt % of the media was printed with a hydrophilic flexographic ink having a particle size of less than about 5 μm by performing the steps of: (1) forming a pulping slurry of printed media and water; (2) adding tall oil to the slurry; and (3) subjecting the slurry to flotation deinking in a flotation cell;

the improvement comprising using partially derosinated tall oil having a rosin acid content of about 5 to 30 wt % in combination with at least one non-ionic or anionic surfactant, at a water hardness greater than about 100 ppm $Ca^{+2}$, and performing the flotation deinking for a period of less than about 10 minutes, wherein the tall oil and the anionic surfactant agglomerate flexographic ink particles prior to the flotation deinking.

12. A method of deinking printed media in which at least about 7.5 wt % of the media has been printed with a hydrophilic flexographic ink having a particle size of less than about 5 μm comprising the steps of:
   (i) forming a pulp slurry of printed media and water having a hardness greater than about 80 ppm $Ca^{+2}$;
   (ii) adding to the slurry:
      (a) a fatty acid or salt thereof of the formula $R^1COO$-M wherein $R^1$ is an alkyl or alkenyl group having about 7 to about 24 carbon atoms and M is hydrogen or a counterion;
      (b) a rosin acid or salt thereof of the formula $R^3COO$-M wherein $R^3$ is an alkylated, tricyclic, fused ring unsaturated group containing about 20 carbon atoms, and M is H or a counterion;
      (c) a non-ionic surfactant represented by the formula:

$$RO[(AO)_n-R^o]_m$$

wherein R is selected from the group consisting of: linear and branched alkyl and alkenyl groups having about 7 to about 24 carbon atoms; $R^1CO$— wherein $R^1$ is a linear or branched alkyl or alkenyl group having about 7 to about 24 carbon atoms; $(R^3)_aC_6H_{5-a}$— wherein $R^3$ is linear or branched $C_7$-$C_{18}$ alkyl and alkenyl and "a" is an integer from 1 to 3; a group derived from a linear, branched, and cyclic aliphatic polyol having about 2 to 6 carbon atoms; and a group derived from a linear, branched, and cyclic aliphatic diacid having about 8 to 42 carbon atoms; AO is an oxyalkylene group having 2 to about 4 carbon atoms or a mixture of such groups in random or block configuration; $R^o$ is selected from the group consisting of H, $R^1$ and $R^1CO$; n is a number from about 4 to 250; and m is an integer from 1 to about 6 wherein the fatty acid or the salt, the rosin acid or salt and the surfactant agglomerate the flexographic ink; and
   (iii) subjecting the slurry to flotation deinking.

13. The method of claim 12, wherein the non-ionic surfactant is added to the slurry prior to the commencement of an air flow for the flotation deinking.

14. The method of claim 12, wherein the non-ionic surfactant is derived from mono-and diglycerides of a naturally occurring fatty acid which have been alkoxylated.

15. The method of claim 14, wherein the non-ionic surfactant comprises a mixture of:

| $CH_2O$—$C(O)$—$R^5$ | and | $CH_2O$—$C(O)$—$R^5$ |
|---|---|---|
| $CHO$—$(AO)_n$—$R^6$ | | $CHO$—$C(O)$—$R^5$ |
| $CH_2O$—$(AO)_n$—$R^6$ | | $CH_2O$—$(AO)_n$—$R^6$ | wherein $R^5$ is an alkyl group derived from the fat, e.g. tallow and $R^6$ is either H or $R^3CO$.

16. The method of claim 12, wherein the fatty acid or salt thereof is a mixture derived from a natural oil selected from the group consisting of marine, rapeseed, tallow, tall oil, soy, cottonseed, and coconut oils.

17. The method of claim 12, wherein the flotation deinking is performed at a water hardness of about 100 to about 400 ppm $Ca^{+2}$.

* * * * *

UNITED STATES PATENT AND TRADEMARK OFFICE
CERTIFICATE OF CORRECTION

PATENT NO. : 5,417,807
DATED : May 23, 1995
INVENTOR(S) : Fossas et al.

It is certified that error appears in the above-indentified patent and that said Letters Patent is hereby corrected as shown below:

Column 5, delete the formulae:

$$CH_2O-C(O)-R^5$$
$$CHO-(AO)_n-R^6 \quad \text{and}$$
$$CH_2O-(AO)_n-R^6$$

$$CH_2O-C(O)-R^5$$
$$CHO-C(O)-R^5$$
$$CH_2O-(AO)_n-R^6$$

and replace them with

$$\begin{array}{l} CH_2O-C(O)-R^5 \\ | \\ CHO-(AO)_n-R^6 \\ | \\ CH_2O-(AO)_n-R^6 \end{array} \quad \text{and} \quad \begin{array}{l} CH_2O-C(O)-R^5 \\ | \\ CHO-C(O)-R^5 \\ | \\ CH_2O-(AO)_n-R^6 \end{array}$$

UNITED STATES PATENT AND TRADEMARK OFFICE
CERTIFICATE OF CORRECTION

PATENT NO. : 5,417,807
DATED : May 23, 1995
INVENTOR(S) : Fossas et al.

It is certified that error appears in the above-indentified patent and that said Letters Patent is hereby corrected as shown below:

Claim 15, delete the formulae:

$$CH_2O\text{-}C(O)\text{-}R^5$$
$$CHO\text{-}(AO)_n\text{-}R^6 \quad \text{and}$$
$$CH_2O\text{-}(AO)_n\text{-}R^6$$

$$CH_2O\text{-}C(O)\text{-}R^5$$
$$CHO\text{-}C(O)\text{-}R^5$$
$$CH_2O\text{-}(AO)_n\text{-}R^6$$

and replace them with

$$\begin{array}{l} CH_2O\text{-}C(O)\text{-}R^5 \\ | \\ CHO\text{-}(AO)_n\text{-}R^6 \\ | \\ CH_2O\text{-}(AO)_n\text{-}R^6 \end{array} \quad \text{and} \quad \begin{array}{l} CH_2O\text{-}C(O)\text{-}R^5 \\ | \\ CHO\text{-}C(O)\text{-}R^5 \\ | \\ CH_2O\text{-}(AO)_n\text{-}R^6 \end{array}$$

Signed and Sealed this

Nineteenth Day of September, 1995

Attest:

BRUCE LEHMAN

Attesting Officer

Commissioner of Patents and Trademarks